United States Patent
Matsuura et al.

(10) Patent No.: US 7,830,061 B2
(45) Date of Patent: Nov. 9, 2010

(54) ELECTRIC MOTOR STATOR AND PERMANENT MAGNET-TYPE ELECTRIC MOTOR USING THE SAME

(75) Inventors: Kenji Matsuura, Fukuoka (JP); Makoto Matsumoto, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 12/483,143

(22) Filed: Jun. 11, 2009

(65) Prior Publication Data

US 2009/0243421 A1 Oct. 1, 2009

Related U.S. Application Data

(63) Continuation of application No. PCT/JP2008/051151, filed on Jan. 28, 2008.

(30) Foreign Application Priority Data

Feb. 13, 2007 (JP) .............................. 2007-032685

(51) Int. Cl.
 *H02K 3/34* (2006.01)
(52) U.S. Cl. ..................................... 310/194
(58) Field of Classification Search ................. 310/194, 310/216.004, 216.009, 216.057, 216.058; 336/192, 198, 212, 233
 See application file for complete search history.

(56) References Cited

U.S. PATENT DOCUMENTS

| | | | | |
|---|---|---|---|---|
| 6,177,751 B1 * | 1/2001 | Suzuki et al. | | 310/269 |
| 6,870,292 B2 * | 3/2005 | Owada et al. | | 310/194 |
| 6,992,417 B1 * | 1/2006 | Yamada | | 310/194 |
| 7,262,540 B2 * | 8/2007 | Lee | | 310/216.004 |
| 2004/0245882 A1 * | 12/2004 | Horie et al. | | 310/194 |
| 2006/0071569 A1 * | 4/2006 | Stewart et al. | | 310/194 |

FOREIGN PATENT DOCUMENTS

| | | |
|---|---|---|
| JP | 09-191588 | 7/1997 |
| JP | 11-041849 | 2/1999 |
| JP | 2005-269755 | 9/2005 |

* cited by examiner

*Primary Examiner*—Tran N Nguyen
(74) *Attorney, Agent, or Firm*—Ditthavong Mori & Steiner, P.C.

(57) ABSTRACT

An electric motor stator according to the present invention includes two resin insulation components, each resin insulation component including a long side portion, facing a side face of the teeth section, and two short side portions, extending from respective ends of the long side portion and facing respective end faces of the laminated core in a lamination direction. The laminated core is clamped by the two resin insulation components from a direction along surfaces of the electromagnetic steel plates, and fitting portions of the two short side portions of each of the two resin insulation components are used to fit the two resin insulation components to each other.

6 Claims, 5 Drawing Sheets

ELECTRIC MOTOR STATOR AND PERMANENT MAGNET-TYPE ELECTRIC MOTOR USING THE SAME

CROSS-REFERENCE TO RELATED APPLICATION

The present application is related to PCT patent application Ser. No. PCT/JP2008/051151 titled "ELECTRIC MOTOR STATOR AND PERMANENT MAGNET-TYPE ELECTRIC MOTOR USING THE SAME," which is incorporated herein by reference.

BACKGROUND OF THE INVENTION

1. Field of the Invention

The present invention relates to a stator of an electric motor provided with a permanent magnet for a rotor and a coil for the stator, and a permanent magnet-type electric motor using the stator. More particularly, the present invention relates to a form of a resin insulation component used in the stator.

2. Description of the Related Art

Hitherto, as insulation components that insulate laminated cores, two resin insulation components have been used (e.g., see FIG. 2 of Japanese Unexamined Patent Application Publication No. 11-41849).

Each of the two resin insulation components has two cantilever portions. Each cantilever portion faces a side face of a teeth section when each of the two resin insulation components having the cantilever portions are inserted into laminated cores. Thin protruding portions are provided as fitting portions at ends of the two cantilever portions of one of the two resin insulation components, and thin recessed portions are provided as fitting portions at ends of the two cantilever portions of the other of the two resin insulation components. One of the resin insulation components is inserted from one end face in a lamination direction of the laminated core towards a center in the lamination direction of the laminated core so as to cover both side faces of the teeth section (that is, both end faces in a widthwise direction of the teeth section). The other resin insulation component is inserted from the other end face in the lamination direction of the laminated core towards the center in the lamination direction of the laminated core so as to cover both side faces of the teeth section. By assembling the two resin insulation components to each other by superimposing the fitting portions upon each other, the laminated core is insulated.

As described above, in each of the related insulation components, thin protruding portions or recessed portions are provided as fitting portions at the ends of the two cantilever portions. Therefore, the insulation components have structural problems in that the base of each of the cantilever portions cannot be made thin. In the related insulation components, when the longitudinal length of each cantilever portion is increased, resin does not reach the end of each cantilever portion during molding due to the positional relationship of a gate of a mold. This results in a manufacturing problem in that the thickness of the base of each cantilever portion cannot be reduced.

SUMMARY OF THE INVENTION

An electric motor stator according to a first aspect of the present invention includes a laminated core being a laminated body of electromagnetic steel plates and including an outer peripheral yoke and a teeth section, the outer peripheral yoke forming a portion of a circumference, the teeth section protruding from an inner periphery of the outer peripheral yoke; and two resin insulation components, each resin insulation component including a long side portion, facing a side face of the teeth section, and two short side portions, extending from respective ends of the long side portion and facing respective end faces of the laminated core in a lamination direction. The laminated core is clamped by the two resin insulation components from a direction along surfaces of the electromagnetic steel plates, and fitting portions of the two short side portions of each of the two resin insulation components are used to fit the two resin insulation components to each other.

BRIEF DESCRIPTION OF THE DRAWINGS

The present invention will be described in further detail with reference to the accompanying drawings wherein.

DESCRIPTION OF THE PREFERRED EMBODIMENTS

First Embodiment

Figure 1A:
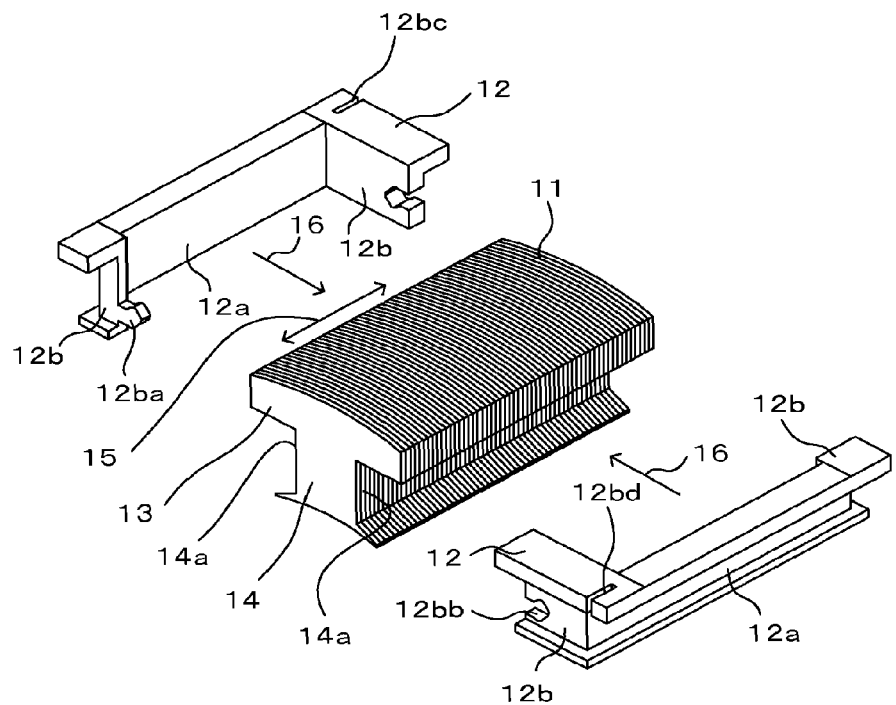
FIGS. 1(a), 1(b), 1(c), and 1(d) illustrate resin insulation components according to an embodiment of the present invention.
Figure 1B:
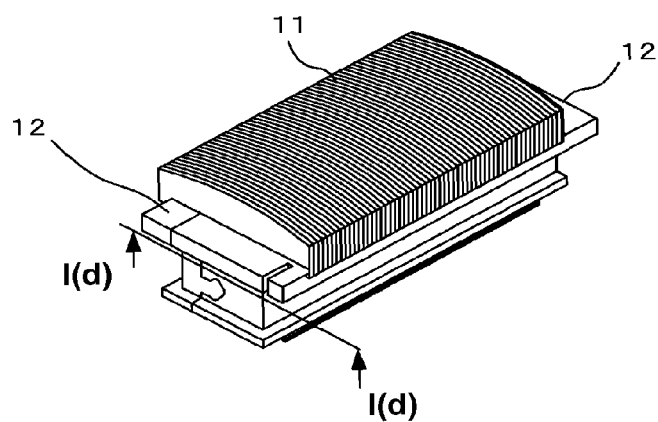

FIGS. 1(a) and 1(b) illustrate resin insulation components according to the present invention. FIG. 1(a) shows a state prior to assembling the resin insulation components, and FIG. 1(b) shows a state after assembling the resin insulation components. In FIG. 1(a), reference numeral 11 denotes a laminated core, and reference numerals 12 denote the resin insulation components.

The laminated core 11 is a laminated body of thin electromagnetic steel plates that are punched out into a form including an outer peripheral yoke 13, constituting a portion of a circumference, and a teeth section 14, having a convex shape and extending at right angles from an inner periphery of the outer peripheral yoke 13. The electromagnetic steel plates are laminated upon each other in the directions indicated by reference numeral 15 in the figure.

In the embodiment, two of the resin insulation components 12 having the same shape are provided. Each of the two resin insulation components has one long side portion 12a and two short side portions 12b. The short side portions 12b are integrally provided with respective ends of the corresponding long side portion 12a. The length of each long side portion 12a is slightly longer than the length in the lamination directions 15 of the laminated core 11, and faces a corresponding side face 14a of the teeth section 14. The two short side portions 12b of each resin insulation component 12 are formed so as to face respective end faces in the lamination directions 15 of the laminated core 11. The two short side portions 12b of each resin insulation component 12 are formed so that, when the two resin insulation components 12 are combined with each other as shown in FIG. 1(b), one of the two short side portions 12b that are to be connected to each other is connected to the facing short side portion 12b.

The two resin insulation components 12 according to the present invention each differ from the two related resin insulation components in that they are inserted into the teeth section 14 of the laminated core 11 from directions along the surfaces of the electromagnetic steel plates of the laminated core 11 (that is, from the directions indicated by reference numerals 16 in FIG. 1(a)). The two resin insulation components 12 clamp the teeth section 14 so as to surround the periphery of the teeth section 14 of the laminated core 11. More specifically, the two resin insulation components 12 clamp the teeth section 14 so that their long side portions 12a face their respective side faces 14a of the teeth section and so that their two short side portions 12b face the respective end faces in the lamination directions 15 of the laminated core 11.

The two short side portions 12b of each resin insulation component 12 are provided with fitting portions for connecting the two resin insulation components 12 to each other. In the embodiment, the two resin insulation components 12 are each provided with a protruding portion 12ba and a recessed portion 12bb, serving as the fitting portions. The structures of the fitting portions are such that the recessed portions and the respective protruding portion that allow the two resin insulation components 12 to be combined with each other by a one-touch operation are connected to each other. As long as fitting can be achieved, the form of the fitting portions are not limited to recessed portions and protruding portions.

The long side portions 12a differ from the related long side portions (cantilever portions) in that fitting portions are not formed thereat. Therefore, the long side portions 12a can be formed very thin. By this, when winding a coil from the state shown in FIG. 1(b), it is possible to increase the proportion of coil wire rods in an area.

Figure 1C:
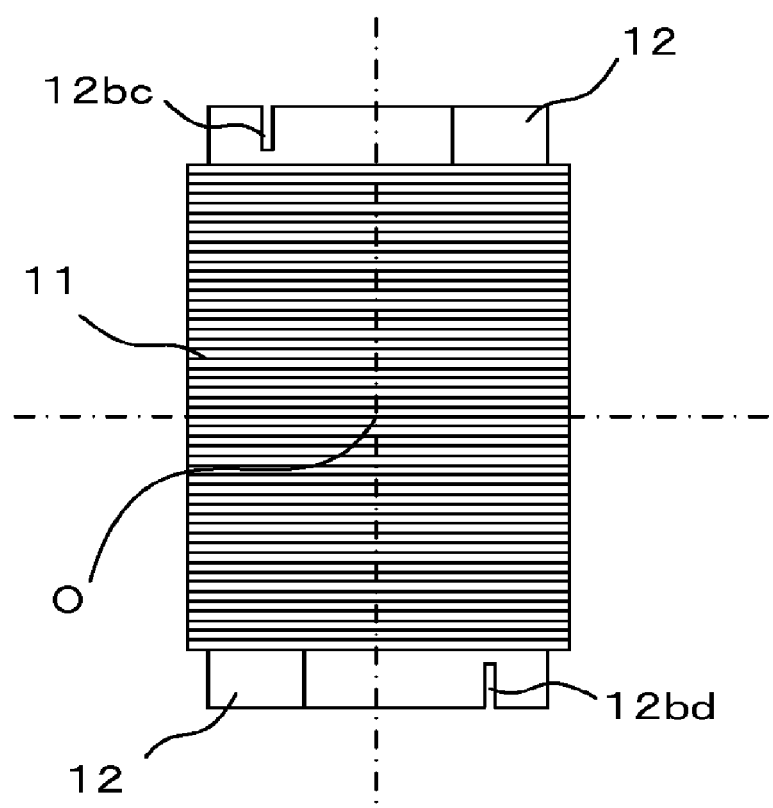

Either one of the two short side portions 12b of each resin insulation component 12 is provided with a groove (coil securing groove) 12bc (or 12bd) that stops a coil winding starting portion when the coil is wound upon the two resin insulation components that are fitted to each other. When, as shown in FIG. 1(c), the two resin insulation components 12 are combined with each other, the grooves 12bc and 12bd are disposed symmetrically with respect to the center O of the laminated core 11 when viewed from the outer peripheral sides of the outer peripheral yoke 13. The grooves 12bc and 12bd are symmetrically formed when they are disposed at the outside diameter side of the two resin insulation components, and the two resin insulation components 12 can be formed using one member. As a result, a mold of the two resin insulation components 12 can be used in common. In addition, the winding of the coil is simplified.

Figure 1D:
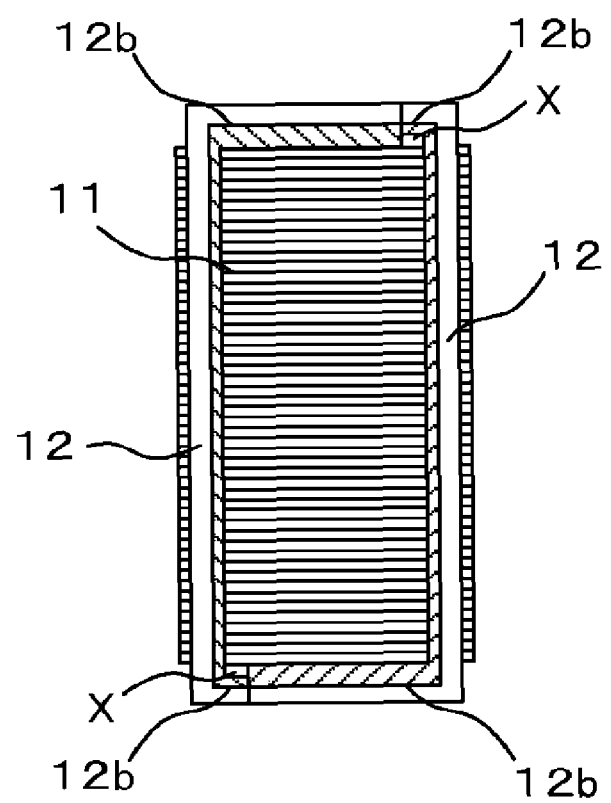

As shown in FIG. 1(d), which is a cross-sectional view of the electric motor stator along a line I(d)-I(d) shown in FIG. 1(b), considering the varied length of the laminated core 11, the length of each long side portion 12a is made slightly larger than the length in the lamination directions 15 of the laminated core 11. This makes it possible to accommodate the variations in the length in the lamination directions 15 of the laminated core 11.

Further, in the embodiment, as shown in FIG. 1(d), one of the two short side portions 12b is longer and thicker than the other short side portion 12b, and the other short side portion 12b is shorter and thinner than the one of the two short side portions 12b, leaving a space X between the shorter and thinner short side portion 12b and one end of the laminated core 11. This makes it possible for the two resin insulation components 12 to withstand winding pressure produced when winding a coil, and to be suitable for the laminated core 11. However, it is possible for the two short side portions 12b to have the same length and thickness, and for the entire shape of each of the two resin insulation components to be substantially U-shaped.

Figure 2A:
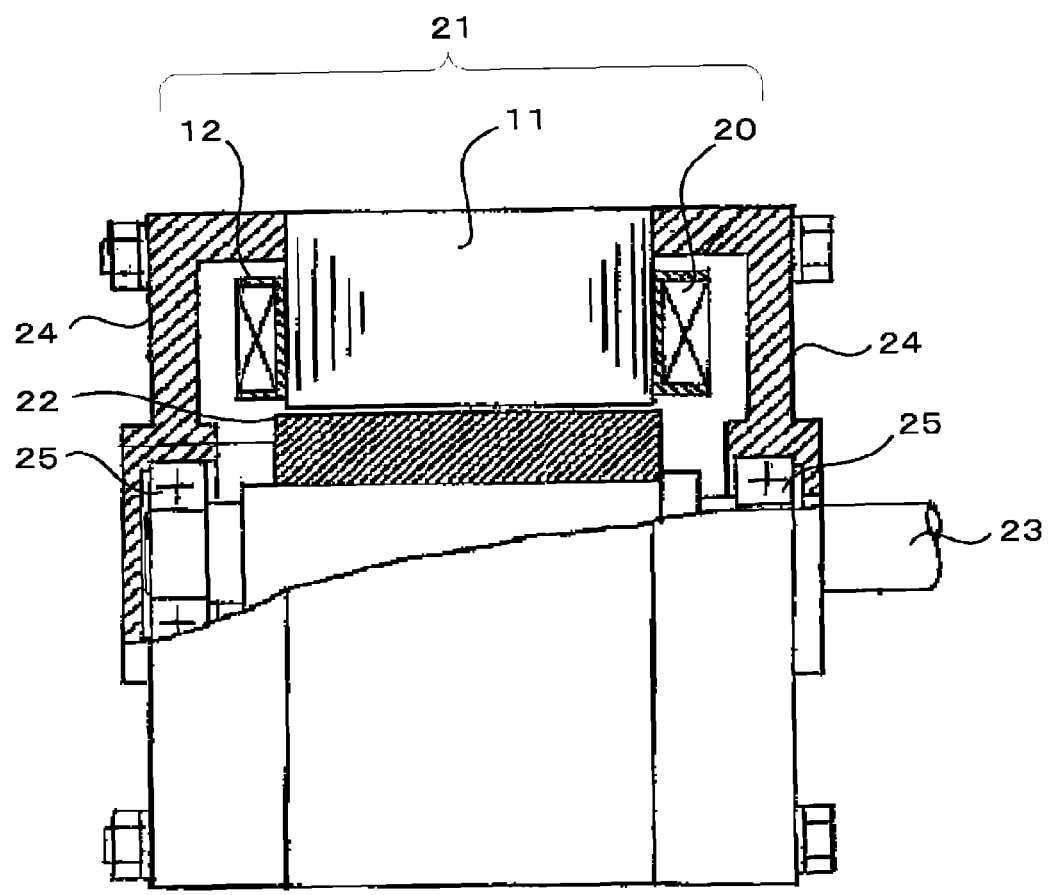
FIGS. 2(a) and 2(b) show an exemplary structure of a permanent magnet-type rotating electric device according to the present invention.
Figure 2B:
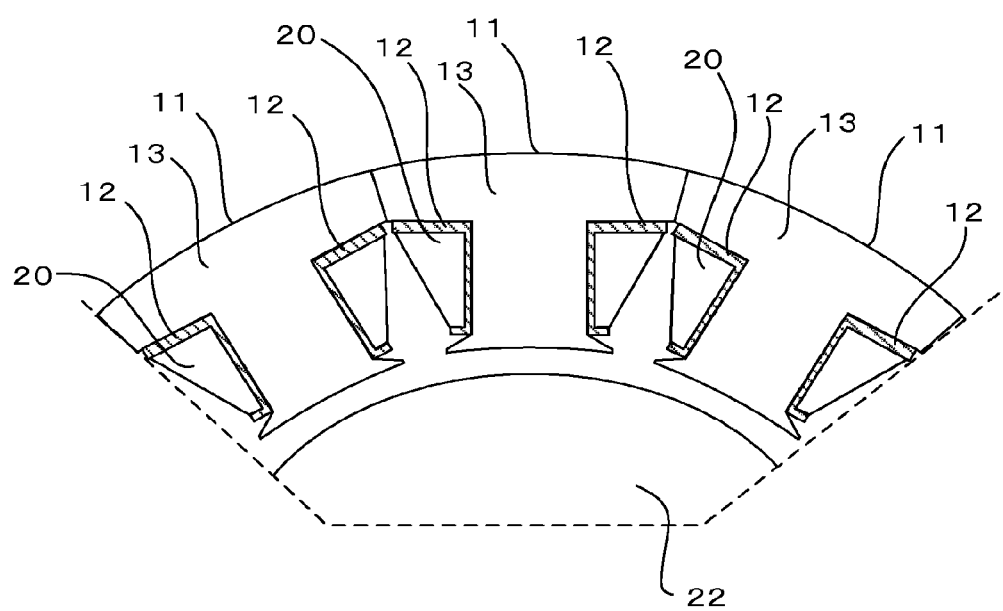

As mentioned above, it is possible to form an annular stator (that is, a stator of an electric motor) by combining a plurality of the laminated cores 11 which are insulated by the two resin insulation components 12. By disposing a rotor with a permanent magnet in an internal space of the stator through a gap, a permanent magnet-type electric motor can be easily formed. An exemplary structure of the permanent magnet-type electric motor is shown in FIGS. 2(a) and 2(b). In FIG. 2(a), reference numeral 20 denotes a coil, reference numeral 21 denotes a stator, reference numeral 22 denotes a rotor, reference numeral 23 denotes a shaft, reference numeral 24 denotes a bracket, and reference numeral 25 denotes a bearing. As shown in FIG. 2(b), which shows a part of the stator 21, the stator 21 has an annular shape, and includes a plurality of laminated cores 11, disposed side by side so that outer peripheral yokes 13 are adjacent to each other, two resin insulation components 12, provided at each of the plurality of laminated cores 11, and the coil 20, wound upon the two resin insulation components 12 fitted to each other. The rotor 22 includes a permanent magnet, and is provided at an outer periphery of the shaft 23. The shaft 23 is rotatably supported by the bearing 25 provided at the bracket 24. The structure shown in FIGS. 2(a) and 2(b) are only one example, so that the structure of the permanent magnet-type electric motor is not limited to the structure shown in FIGS. 2(a) and 2(b).

What is claimed is:

1. An electric motor stator comprising:
   a laminated core being a laminated body of electromagnetic steel plates and including an outer peripheral yoke and a teeth section, the outer peripheral yoke forming a portion of a circumference, the teeth section protruding from an inner periphery of the outer peripheral yoke; and
   two resin insulation components, each resin insulation component including a long side portion, facing a side face of the teeth section, and two short side portions, extending from respective ends of the long side portion and facing respective end faces of the laminated core in a lamination direction, the two short side portions of each of the two resin insulation components being provided with fitting portions used to fit the two resin insulation components to each other,
   wherein a length of each long side portion is longer than a length of the laminated core in the lamination direction thereof, and one of the two short side portions of each resin insulation component is longer and thicker than another short side portion thereof.

2. The electric motor stator according to claim 1, wherein the fitting portions are recessed portions and protruding portions of the two resin insulation components.

3. The electric motor stator according to claim 1, wherein either one of the two short side portions of each resin insulation component is provided with a groove that stops a winding starting portion of a coil that is wound upon the two resin insulation components that are fitted to each other.

4. The electric motor stator according to claim 3, wherein the groove of either one of the two short side portions of each resin insulation component is provided so that the grooves are disposed symmetrically with respect to a center of the laminated core when the grooves of the two resin insulation components are viewed from outer peripheral sides of the outer peripheral yoke when the two resin insulation components are fitted to each other.

5. The electric motor stator according to claim 1, wherein the electric motor stator comprises a plurality of the laminated cores and the two resin insulation components, the plurality of the laminated cores being arranged side by side so that a plurality of the outer peripheral yokes are adjacent to each other, the two resin insulation components being provided at each of the plurality of the laminated cores.

6. A permanent magnet-type electric motor comprising:
   the electric motor stator according to claim 5; and
   a rotor with a permanent magnet, the rotor being disposed in a space surrounded by a plurality of the teeth sections of the electric motor stator through a gap.

* * * * *